United States Patent [19]
Estrade

[11] 3,807,244
[45] Apr. 30, 1974

[54] DEVICE FOR TRANSFORMING KINETIC ENERGY

[76] Inventor: Fernand Estrade, Tananarive, France

[22] Filed: Apr. 12, 1972

[21] Appl. No.: 243,199

[52] U.S. Cl. ............................................. 74/84 S
[51] Int. Cl. ....................... F03h 5/00, F16h 33/20
[58] Field of Search ......... 74/84 S; 180/7 R; 46/207

[56] References Cited
FOREIGN PATENTS OR APPLICATIONS
770,555   3/1957   Great Britain ...................... 74/84 S

*Primary Examiner*—Allan D. Herrmann
*Attorney, Agent, or Firm*—Charles Hieken, Esq.; Jerry Cohen, Esq.

[57] ABSTRACT

Device for transforming kinetic energy, comprising a motor driving heavy moveable bodies along a non-circular trajectory to create a driving thrust in a certain direction to cause the displacement of the devices.

The heavy moveable bodies are grouped two by two as an integral part of a non-extendable component rotated by motor. This component can slide freely with respect to the axis of rotation. A deflector is provided on at least part of the trajectory of the moving bodies and comes into contact with the moving bodies during their movement, and transforms the kinetic energy of the moving bodies into a driving thrust.

5 Claims, 2 Drawing Figures

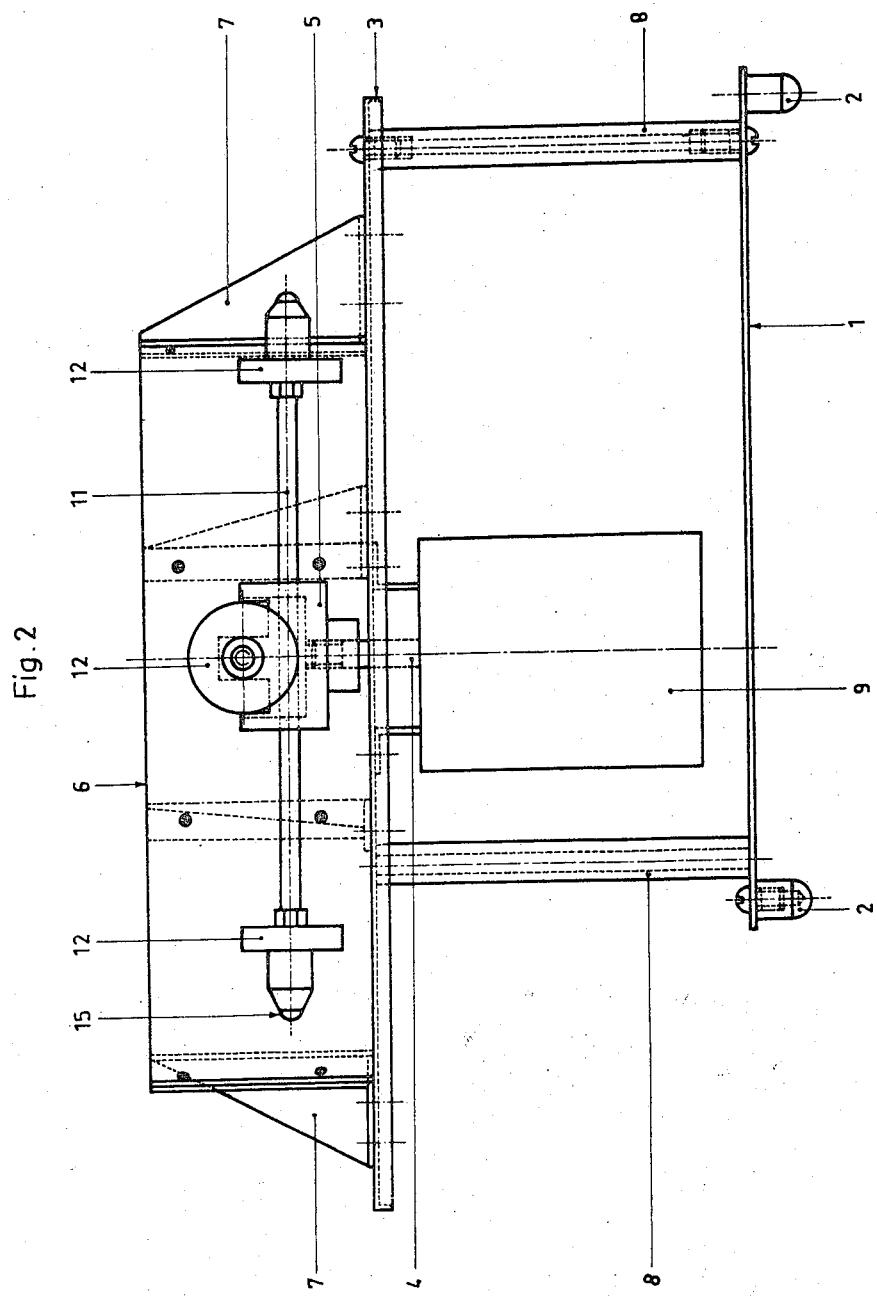

DEVICE FOR TRANSFORMING KINETIC ENERGY

The present invention relates to a device for transforming kinetic energy of type comprising a motor driving flyweights along trajectories of form selected to determine the force of thrust.

The device according to the present invention can be used for laboratory work as well as for driving any moveable bodies such as road or rail vehicles, or aircraft and spacecraft.

The device can also be used as a scientific toy.

The present invention thus relates in general to a device for transforming kinetic energy comprising a motor, characterised in that the motor drives the moveable bodies along a predetermined non-circular trajectory to create a thrust which drives the device.

According to another characteristic feature of the invention, the device consists of a rotatable component, driven by a motor which rotates the flyweights describing a non-circular trajectory.

According to another characteristic feature of the invention, the rotatable component comprises a shaft provided with housing passing right through it, these housings receiving rods which slide freely in them, and of which each end is provided with a flyweight, though these rods provided with a roller component being guided on at least one part of their trajectory by a guide which is an integral part of the framework.

The present invention will be described in greater detail with the aid of a mode of application and accompanying drawings in which:

FIG. 2 is a front view of the device according to FIG. 1.

Figure 1:
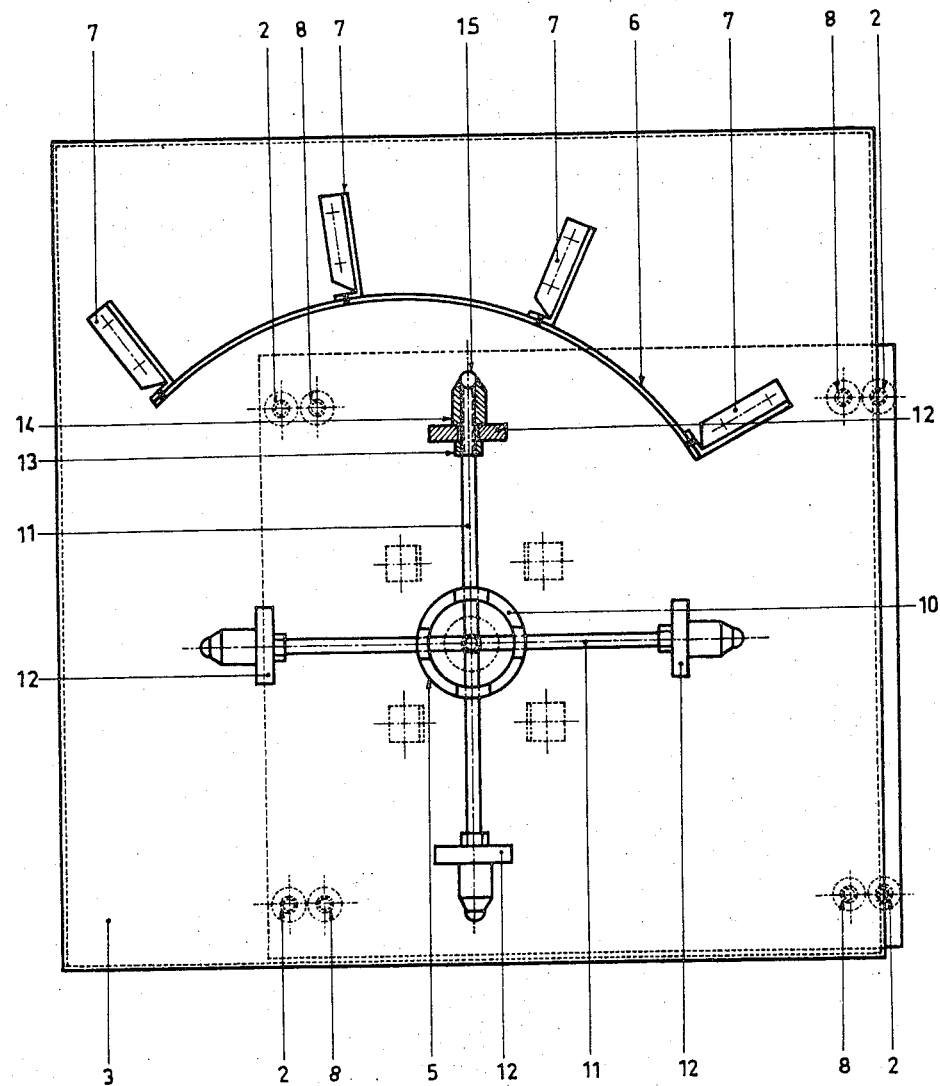
FIG. 1 is a plan view of the device according to the invention.

The device for transforming kinetic energy according to the present invention, consists, as shown in FIGS. 1 and 2, of a framework support 1 provided with roller components 2, for example, balls or castors.

The framework support 1 is provided with a platform 3 which receives the rotatable part 5 and the guide path 6. The guide path 6 is connected to the platform 3 by means of the supports 7.

The support 3 is connected to the framework 1 by means of the uprights 8 and the space in between is occupied by a motor 9 which rotates the rotatable part 5.

As is seen more clearly from FIG. 1, the rotatable part 5 comprises a cylindrical component 10 receiving the rods 11 with the flyweights 12.

These rods 11 slide freely, being housed in orifices drilled in the cylinder 10. In the example illustrated, two rods 11 with flyweights 12 are placed at right angles to one another.

However, the number of rods can be greater than two. Each rod 11 with flyweights 12 comprises a rod as such provided at each of its ends with a flyweight 12 connected integrally to the rod by means of a nut 13 and a locknut 14. The locknut 14 serves also to receive a roller component 15 such as a ball.

When the motor rotates the rotatable part, the flyweights provided at the end of each rod describe complex trajectories, depending on the shape of the guide 6 against which the flyweights press by means of their roller component, on one part of their trajectory, resulting in driving thrust.

The direction of the driving thrust depends both on the rotational velocity and the shape of the guide 6.

These are two parameters, which can be modified to change the direction of the thrust, and the intensity of its force.

Under the action of the centrifugal force imparted by the rotary movement of the motor, the masses move along a trajectory which is a function of the rotational velocity, the length of the rods and the weight of the masses.

The moveable object then advances in the same direction as that of the thrust.

In the mode of application described above, the flyweights are provided at each extremity of a rod 11, moved together. However, within the scope of the present invention, it would also be possible to provide extendable rods, of which one end is connected to the shaft or to the cylinder 5, the other end of each rod comprising a flyweight provided with a roller component.

As before, this roller component moves on the guide component, on at least a part of the trajectory of the flyweight in order to form this trajectory.

It is obvious that the invention is not limited to the application herein above described and illustrated, and that on the basis of it other modes and other forms of application can be envisaged within the scope of the invention.

What I claim is:

1. Apparatus for converting kinetic energy into a driving thrust comprising, at least one rod, heavy movable bodies fixed to each end of said rod, motor means for rotating said rod, sliding linkage means intercoupling said rod and said motor for imparting rotating movement to said rod and maintaining said rod and the rotating shaft of said motor in fixed angular relationship while allowing relative displacement therebetween along a radial direction, and deflecting means for engaging said heavy movable body along at least a part of their trajectory about the motor axis for urging the heavy movable bodies thus contacted toward the motor axis.

2. Apparatus in accordance with claim 1 wherein said sliding linkage comprises a housing of a hub of the motor shaft formed with diametrically opposed openings through which said shaft slides.

3. Apparatus in accordance with claim 2 wherein said heavy movable body comprises a weight and a roller component at the outer end thereof for rolling engagement with said deflecting means.

4. Apparatus in accordance with claim 3 wherein said roller component comprises a ball crimped to the end of a sleeve attached to the rod, the other end of said sleeve carrying an annular weight.

5. Apparatus in accordance with claim 1 wherein there are at least two of said rods carrying said heavy movable bodies at each end.

* * * * *

UNITED STATES PATENT OFFICE
CERTIFICATE OF CORRECTION

Patent No. 3,807,244          Dated April 30, 1974

Inventor(s) Fernand Estrade

It is certified that error appears in the above-identified patent and that said Letters Patent are hereby corrected as shown below:

In the heading add -- Claims priority, application France, March 11, 1971, 71 08 541. --.

Signed and sealed this 29th day of October 1974.

(SEAL)
Attest:

McCOY M. GIBSON JR.  
Attesting Officer

C. MARSHALL DANN  
Commissioner of Patents